United States Patent [19]
Meester

[11] Patent Number: 5,573,459
[45] Date of Patent: Nov. 12, 1996

[54] TWO STAGE SHAKER

[75] Inventor: David J. Meester, Fresno, Calif.

[73] Assignee: FMC Corporation, Chicago, Ill.

[21] Appl. No.: 444,639

[22] Filed: May 19, 1995

[51] Int. Cl.[6] .................................................. A01D 46/00
[52] U.S. Cl. .................... 460/145; 56/327.1; 56/328.1
[58] Field of Search ................................ 460/145, 114, 460/133, 144, 146, 147, 148, 149, 150; 56/327.1, 328.1

[56] References Cited

U.S. PATENT DOCUMENTS

| | | | |
|---|---|---|---|
| 3,473,613 | 10/1969 | Boyce | 460/145 X |
| 3,656,488 | 4/1972 | Dumanowski et al. | 460/145 |
| 4,157,005 | 6/1979 | Orlando et al. | 56/228 |
| 4,335,570 | 6/1982 | Fitzmaurice | 56/327.1 |
| 5,197,269 | 3/1993 | Meester | 56/328.1 X |

FOREIGN PATENT DOCUMENTS 4313320  10/1994  Germany .................................. 460/144

*Primary Examiner*—Terry Lee Melius
*Attorney, Agent, or Firm*—Michael B. K. Lee; Douglas W. Rudy

[57] ABSTRACT

The invention provides an improved method and apparatus for separating fruits, such as tomatoes, from vines. The invention uses feeder bars to provide tomatoes to a shaker brush a first time. The vines are allowed to fall out of the shaker brush to a shaker conveyor. The shaker conveyor conveys the vines into the shaker brush a second time, and then to a vine reel, thus providing an improved separation of tomatoes from the vine.

17 Claims, 4 Drawing Sheets

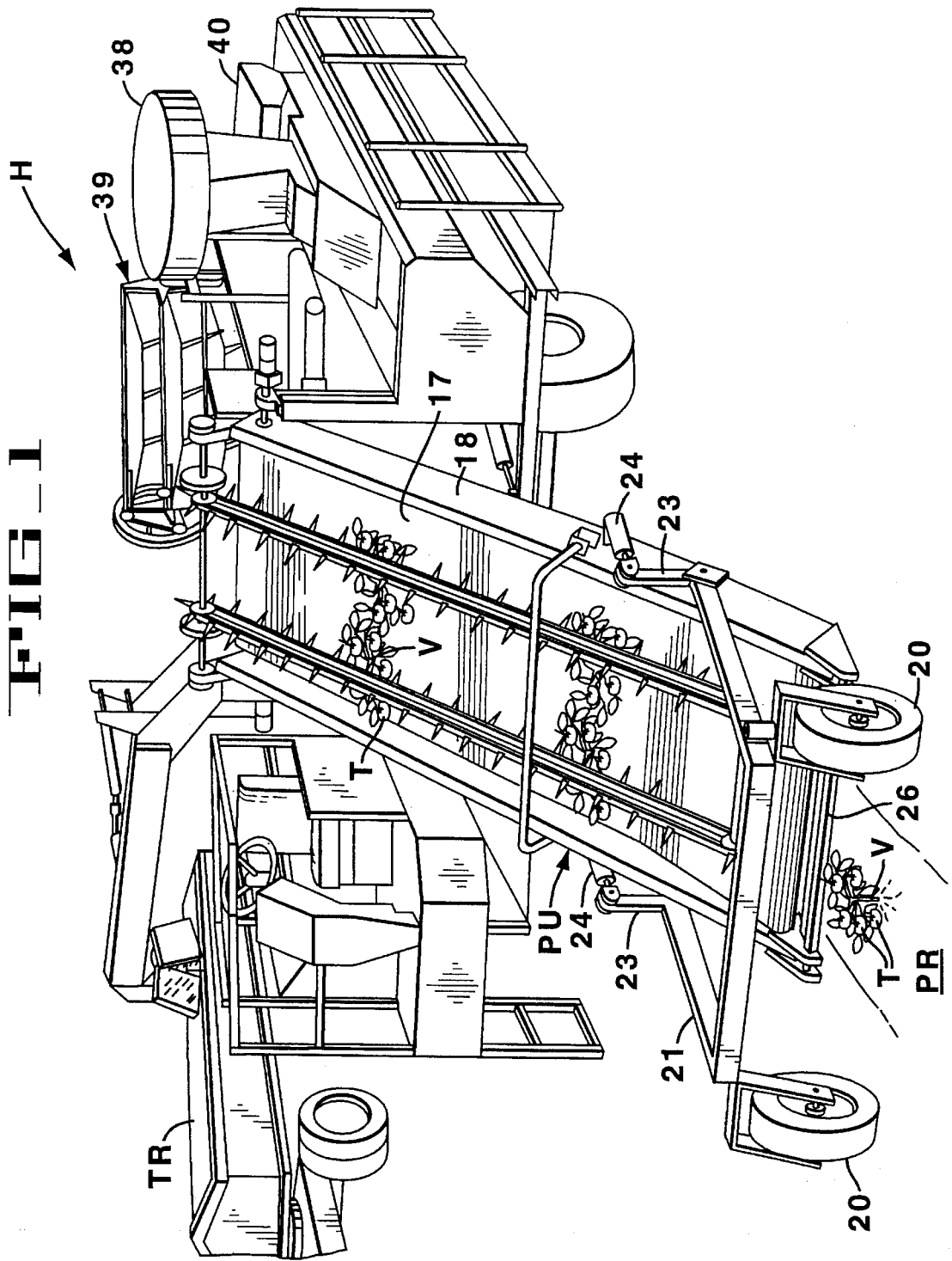
FIG_1

FIG_2
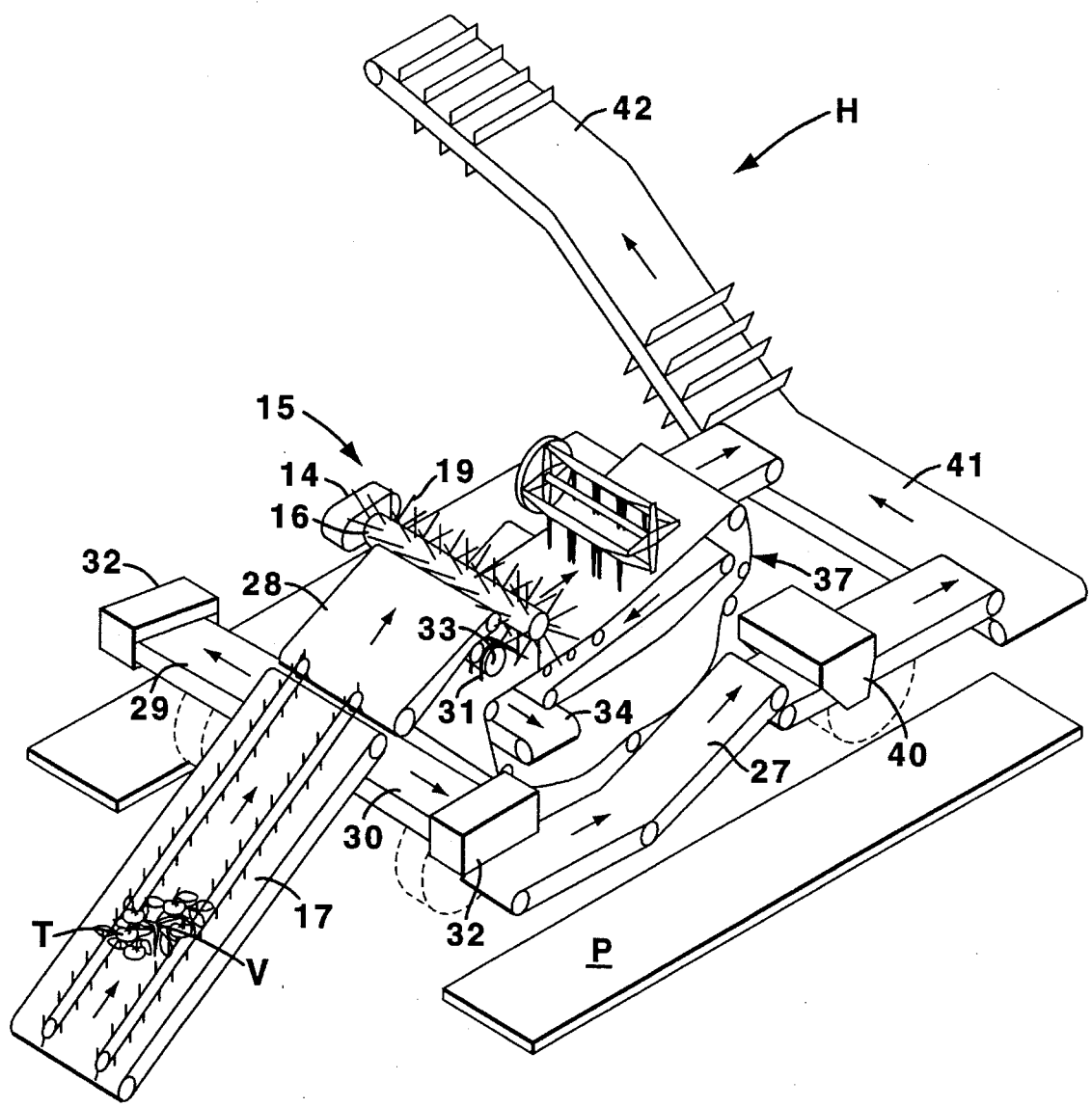

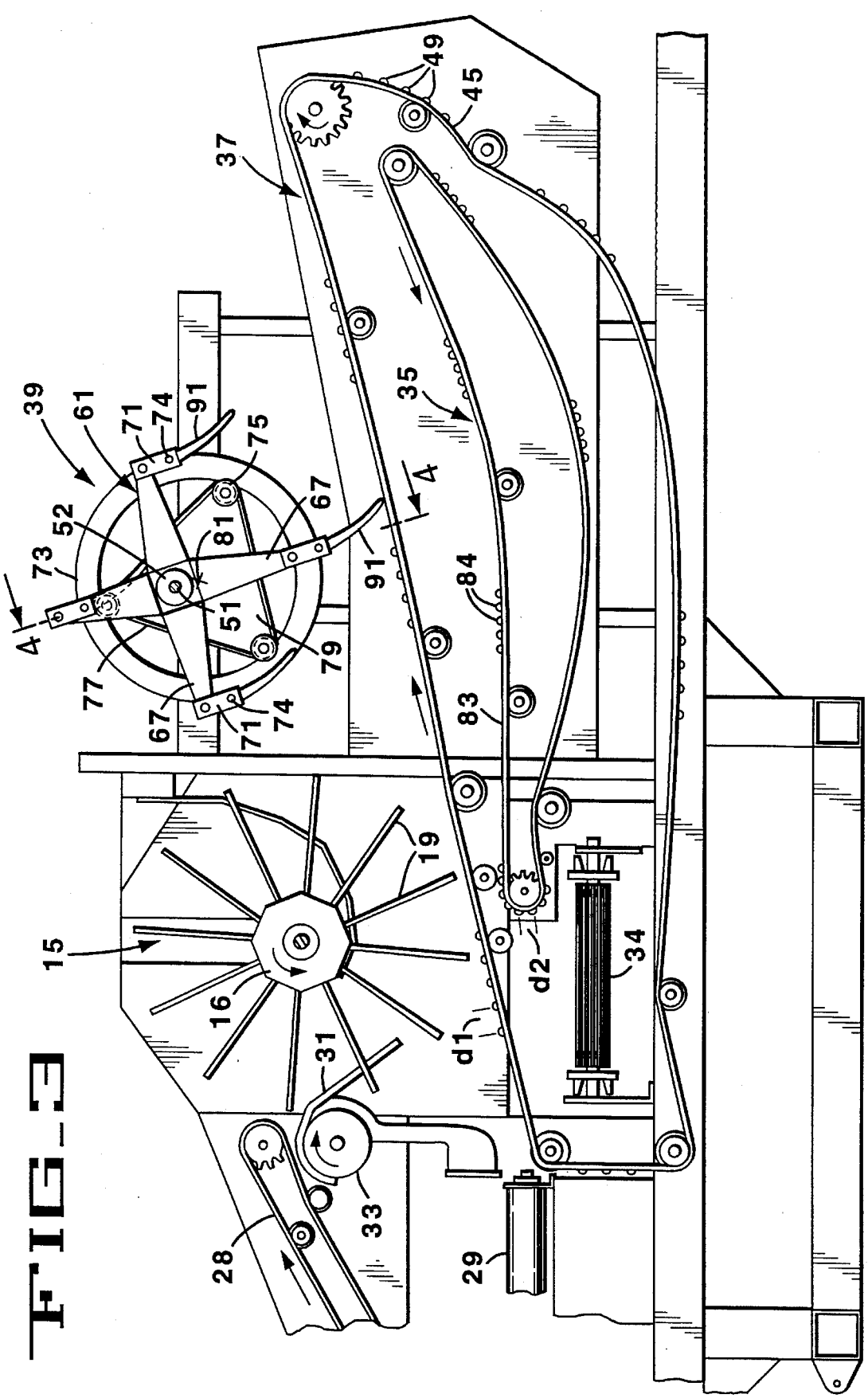

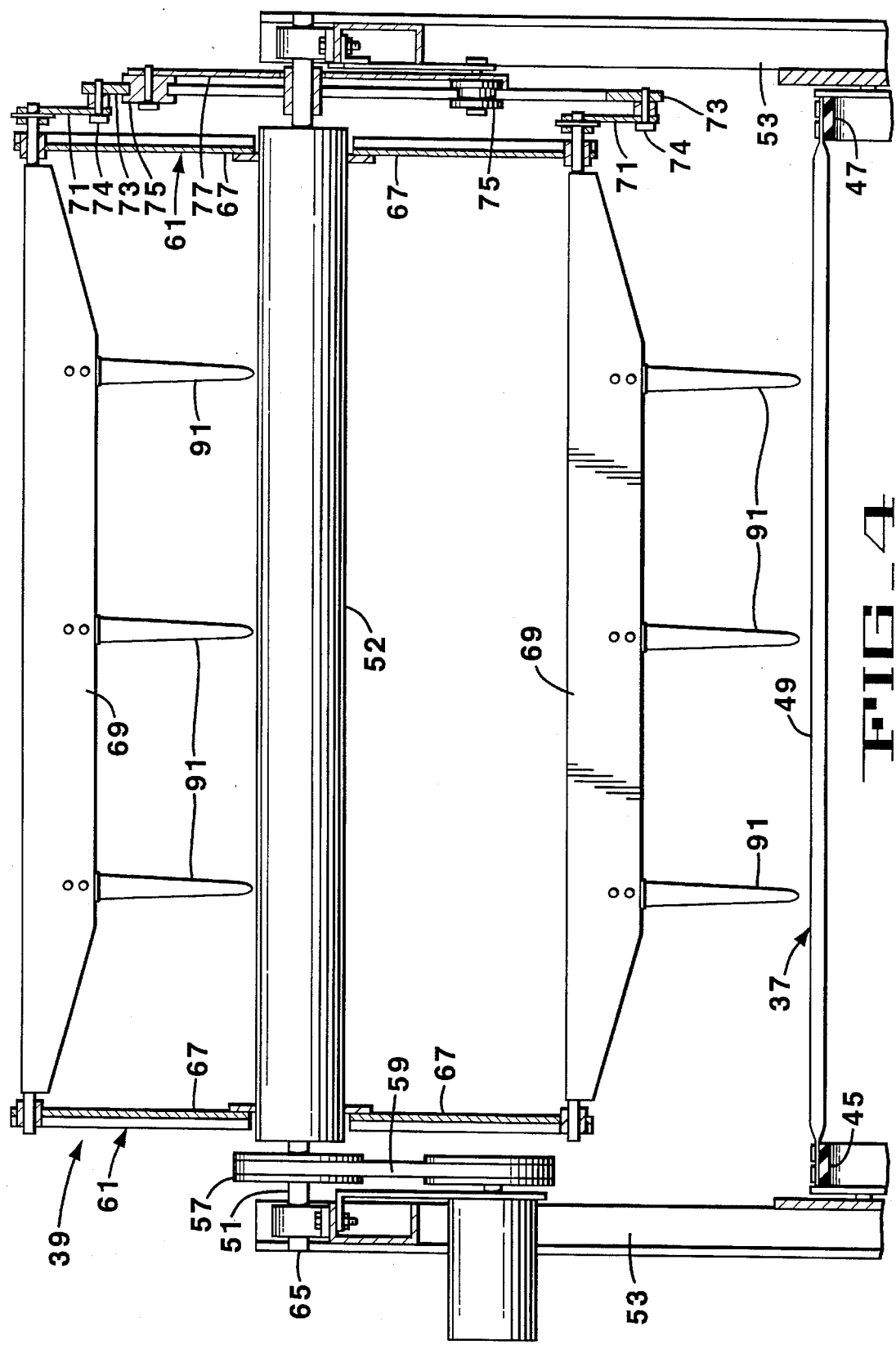

TWO STAGE SHAKER

This invention generally relates to apparatus for harvesting above-ground vegetable crops, such as tomatoes. More particularly, the present invention concerns harvesters of the type which include a shaking mechanism for removing fruit from the vine and means for collecting said fruit.

Direct-loading harvesters have been known in the art for many years and have enjoyed wide-spread use in the harvesting of tomatoes. Typically, such harvesters are arranged to harvest tomato plants grown in rows, to elevate the harvested plants to a shaker brush for separating tomatoes from their vines, to carry the tomatoes from the shaker brush to sorter conveyors where undesired tomatoes and trash are removed, and finally to elevate the remaining tomatoes from the harvester to an attendant truck or trailer for delivery to processing plants.

The invention provides an improved method and apparatus for separating tomatoes or other vegetable crops from vines and leaves. The invention provides a conveyor, which provides the improved feeding of vines to the shaker assembly and the improved separation of tomatoes or other vegetable crops from the vines. The invention also provides a tined means to separate vines to allow tomatoes caught between the vines to be released.

FIG. 1 is a perspective view of a tomato harvester using a preferred embodiment of the invention.

FIG. 2 is a schematic representation of a tomato harvester using a preferred embodiment of the invention, illustrating the paths taken by the tomatoes, vines and, debris after they are harvested.

FIG. 3 is a central section of part of the harvester illustrated in FIGS. 1 and 2.

FIG. 4 is a cross-sectional view along lines 4—4 in FIG. 3.

The preferred embodiment of the present invention is used in a tomato harvesting machine H, as illustrated in FIG. 1. The tomato harvesting machine H is adapted to harvest tomatoes T from vines V grown in a row on an elongate planting ridge PR. The harvesting machine H is designed to proceed along the planting ridge PR, sever the tomato vines V at ground level, elevate the vines for further processing, separate the tomatoes from the vines, and transfer the tomatoes to an awaiting truck TR.

The tomato harvesting machine H includes a pickup mechanism PU comprising a pickup conveyor 17 mounted in a header frame 18, said header frame being pivotally attached to the main frame of the harvester H. The front end of the header frame 18 is supported by a pair of wheels 20 mounted on a U-shaped support frame 21 which is pivotally attached to the front end of said header frame. A pair of lever arms 23 extend upward from the U-shaped support frame 21 and are adapted to raise and lower said support frame with respect to the front end of the header. A pair of hydraulic piston and cylinder assemblies 24 are attached to the distal ends of the lever arms 23 at the piston rod and to the header frame 18 at the cylinder end. Actuation of the, cylinder assemblies 24 allows the distance that the front end of the pickup mechanism PU travels below the ground to be adjusted.

A cutting means is provided at the front end of the pickup mechanism PU to sever the tomato vines at or near the ground level. The curling means may be of various types, and a rotating cutting bar 26 is illustrated in FIG. 1. The cutting bar 26 is rotatably attached at both ends to the header frame 18 and is rotated by a hydraulic motor (not shown). As the harvester H is driven i forward, the cutting bar 26 encounters the individual vines V and severs them near the ground. After severing, the vines V fall onto the pickup conveyor 17 and are elevated for further processing on the main frame of the harvester, as will be described hereinafter.

Referring to FIG. 2, the overall operation of the tomato harvester H will now be described in general terms. A longitudinal transfer conveyor 28 is adapted to receive the tomatoes T and vines V from the pickup conveyor 17. There is a small gap between the discharge end of the pickup conveyor 17 and the receiving end of the transfer conveyor 28 which allows loose tomatoes, dirt clods and other debris to drop from the vines in transit. These loose tomatoes and debris fall onto one of two din cross conveyors 29, 30 which transfer them to the right side and the left side respectively, of the harvester H (FIG. 2). It should be noted that the further processing undergone on both sides of the harvester H is identical and that such processing will be described only for the left side of the machine which is fed by the left dirt cross conveyor 30.

The tomatoes, dirt and other debris are discharged from the left dirt cross conveyor 30 through a dirt sorter electronic system 32, where the red tomatoes are retrieved back onto a longitudinal sorter conveyor 27. The dirt, debris, and green tomatoes fall off the conveyor through the din sorter electronic system 32 to a trash chute and then to the ground. Sorters, who stand on platform P, manually remove undesirable tomatoes and dirt that may have reached sorter conveyor 27.

The transfer conveyor 28 discharges vines V with attached tomatoes T to a set of feeder bars 31 composed of a plurality of stationary parallel bars which on a first end are wrapped around a moving roller 33 and on a second end are straight and angled downward as shown. The feeder bars 31 direct the vines under a shaker brush assembly 15, which comprises a shaker brush 16 with shaker brush 16 tines 19, and a means for vibrating the shaker brush 16, such as an eccentric weight assembly 14. When vibrating the shaker brush 16 with an eccentric weight assembly 14, bearing friction in the drive mechanism, also results in the rotation of the shaker brush 16. In the specification and claims a shaker brush is defined as a tined brush that provides rotational oscillation. Gravity and bearing friction from the eccentric weight assembly 14 draw the vines from the feeder bars 31 to a shaker conveyor 37 which moves the vines V in a rearward direction under the shaker brush 16. The shaker brush 16 is positioned to engage the vines supported on the shaker conveyor 37. FIG. 3 illustrates a cut away side view of the feeder bars 31, the shaker brush 16, the shaker conveyor 37 and the moving roller 33.

Some of the tomatoes T which have been disengaged by the shaker brush 16 fall through the openings in the shaker conveyor 37 onto either of two fruit cross conveyors 34. Other tomatoes T which have been disengaged by the shaker brush 16 are caught between vines V, and at first are not able to reach the openings in the shaker conveyor 37.

The shaker conveyor 37 causes the vines V with loosened tomatoes T to pass below a vine reel 39. The vine reel 39 separates the vines and allows tomatoes T to fall through the vines V and through the shaker conveyor 37 to a fruit conveyor 35, located beneath the shaker conveyor 37. The vine reel 39 is disclosed in U.S. Pat. No. 5,197,269, incorporated by reference. The remaining vines V are conveyed by the shaker conveyor 37 to the rear of the harvester H, where they are allowed to fall to the ground. FIG. 4 illustrates the section taken along lines 4—4 of FIG. 3, illustrating the vine real 39 and the shaker conveyor 37.

The vine reel: 39 is mounted on a shaft 51, upon which the vine reel 39 rotates. The shaft 51 is mounted on a frame member 53. A reel drive 52, which surrounds a significant length of the shaft 51, is attached to the shaft 51 and driven by the shaft 51. The shaft 51 is driven by a shaft pulley 57, which is driven by a drive belt 59, which is driven by a drive pulley, which is driven by a motor. Spiders 61 are connected to the reel drive 52 and is rotated by the reel drive 52. The shaft 51 and the reel drive 52 pass through the centers of the spiders 61. At the end of each arm 67 of the spiders 61 are bats 69, at which extend from an arm 67 of one spider 61 to the arm 67 of another spider 61. The bats 69 are journaled to rotate with respect to the arms 67. At the ends of each bat 69 are flanges 71 with the first end of a flange 71 connected to a bat 69. The second end of each flange 71 is connected to a ring 73 by a pin 74. The ring 73 is mounted on three rollers 75. The rollers 75 are mounted on a reel cam 77. The center 81 of the three rollers 75 is offset from the center 65 of the shaft 51 so that the center 65 of the shaft 51 passes through the triangular area 79 a set distance from the center 81 of the three rollers 75. A plurality of tines 91 extend downward from the bats.

In operation, the shaker conveyor 37 passes vines V and loosened tomatoes T, Which are caught among the vines V, under the vine reel 39. The shaker conveyor 37 rotates in a clockwise direction as indicated in FIG. 3, to carry the vines from under the shaker brash 16. The vine reel 39 is rotated in a counter clockwise direction as indicated so that near the shaker conveyor 37 the tines 91 move in the same direction as the shaker conveyor 37. As viewed in FIG. 3, the tines 91 on the left side of the vine reel 39 enter the vines in a substantially vertically downward direction with a substantially zero velocity along the direction of movement of the shaker conveyor 37. The tines 91 on the bottom of the vine reel 39 pass over the shaker conveyor 37 with a velocity along the direction of movement of the shaker conveyor 37, which is substantially twice the velocity of the shaker conveyor, and with a vertical velocity of substantially zero. As viewed in FIG. 3, the tines 91 ion the right side of the vine reel 39 leave the vines in a substantially vertically upward direction with a substantially zero velocity along the direction of movement of the shaker conveyor 37. Therefore, as the tines 91 move from left to right under the vine reel 39, as viewed in FIG. 3, the tines 91 go from a substantially zero velocity along the direction of the shaker conveyor 37, to twice the velocity of the shaker conveyor 37 along the direction of the shaker conveyor 37, to a substantially zero velocity along the direction of the shaker conveyor 37. The change in velocity of the tines 91 with respect to the movement of the shaker conveyor 37, causes the vines V which engage the tines 91 to be agitated and separated allowing loosened tomatoes T, which are caught between the vines V, to escape from between the vines V and pass through the shaker conveyor 37 to the fruit conveyor 35. By keeping the tines 91 substantially vertical, the tines 91 can be easily inserted into and removed from the vines V, and are useful in separating the vines V.

The fruit conveyor 35 carries the tomatoes forward on the harvester H and discharges them onto either of the two fruit cross conveyors 34, with only the left fruit cross conveyor 34 being shown in FIG. 2.

The fruit which has fallen onto fruit cross conveyor 34 is discharged onto the sorter conveyor 27 where it joins the fruit directed there by the left dirt cross conveyor 30. The fruit which is fallen onto the other cross conveyor is discharged to the other side of the machine where it joins the second processing line. The tomatoes discharged from the sorter conveyor 27, having been manually and mechanically sorted to remove unsuitable tomatoes and debris, are directed to an automatic color sorter 40 where further undesirable tomatoes may be ejected from the harvester H. A suction fan and suction fan housing 38 are provided to further remove debris before the debris reaches the: color sorter 40.

The inspected tomatoes are then discharged onto the cross feed conveyor 41 where they join the inspected tomatoes from the other side of the harvester H, all tomatoes then being directed to the right hand side of the harvester H. From the cross feed conveyor 41, the tomatoes are directed to the discharge conveyor 42 where the tomatoes are elevated and discharged into a receiving truck TR (FIG. 1) which travels alongside the harvester H.

As described above, the feeder bars 31 are composed of a plurality of rigid parallel stationary bars which on a first end are wrapped around a moving roller 33 and on a second as end are straight and angled downward as shown. The feeder bars 31 are angled between 30° and 60° from the horizontal plane.

The shaker conveyor 37 comprises a first endless belt 45 and a second endless belt 47 with a plurality of metal rods 49 extending in parallel there between. The plurality of rods 49, extending from the first endless belt 45 to the second endless belt 47, are spaced apart to allow tomatoes to pass between the rods 49 to the fruit conveyor 35 below the shaker conveyor 37. In the preferred embodiment, the plurality of rods 49 are spaced a distance "d1" of 4 inches apart. Preferably, the rods 49 are spaced in the range of 3 inches to 6 inches apart. The fruit conveyor 35 also comprises first and second endless belts 83 with a plurality of metal rods 84 extending in parallel there between. In the preferred embodiment, the spacing between the metal rods 84 of the fruit conveyor 35 is a distance "d2" of 1 inch apart. Preferably, the rods 84 are spaced in the range of 0.5 inches to 2 inches apart. The shaker conveyor 37 extends almost to the dirt cross conveyors 29, 30, under the roller 33, under the feeder bars 31, under the shaker brush 16, and under the vine reel 39. The shaker conveyor 37 surrounds the fruit conveyor 35 and the fruit cross conveyors 34, so that part of the shaker conveyor 37 is above the fruit conveyor 35 and the fruit cross conveyors 34 and part of the shaker conveyor 37 extends under the fruit conveyor 35 and the fruit cross conveyor 34.

Because the metal rods 49 extend across the shaker conveyor 37 the shaker brush 16 is positioned sufficiently above the shaker conveyor 37 so that the tines 19 of the shaker brush 16 do not reach or pass through the shaker conveyor 37. This allows the vines to fall out of from the shaker brush 16 before they are conveyed back into the shaker brush 16.

In operation, the transfer conveyor 28 discharges vines V with attached tomatoes T to a set of feeder bars 31. The feeder bars 31 direct the vines under a shaker brush 16. Gravity and bearing friction pull the vines from the feeder bars 31 to a shaker conveyor 37 which moves the vines V in a rearward direction under the shaker brush 16. Falling from the feeder bars 31 to the shaker conveyor 37 allows the vines V to fall out of the shaker head assembly, allowing the volume of the vine mass to expand. The expansion of the vine mass, provides a separation of the vines, allowing loosened tomatoes to drop from the vine :mass, through the shaker conveyor 37 to the fruit cross conveyor. The shaker conveyor 37 then moves the vines V back into T the shaker brush 16.

Although extending the conveyor so that vines may drop out of the shaker brush 16 and moving the vines through the shaker brush 16 by use of the shaker conveyor 37 improves the release of the tomatoes from the vines, some loosened tomatoes are still caught in the vine mass. For this reason, the shaker conveyor 37 causes the vines V with loosened tomatoes T to pass below a vine reel 39. The vine reel 39 separates the vines and allows tomatoes T to fall through the vines V and through the shaker conveyor 37 to a fruit conveyor 35.

The invention is an improvement over the apparatus described in U.S. Pat. No. 4,335,570 incorporated by reference, in that this invention provides a more durable conveyor in the shaker conveyor 37. The apparatus described in the patent causes the tines of the shaker brush to pass through the conveyor,: thus requiring the less durable conveyor. This more durable conveyor is able to use the backside of the shaker brush 16 and the vine reel 39 which provides an improved separation thus providing a two stage shaker brush devise. In addition, the apparatus described in U.S. Pat. No. 4,335,570 lacks feeder bars 31 which feed the vines V into the shaker brush 16 allowing for an initial shaking and then allow the vines V to drop out from the shaker brush 16, thus allowing the vines to expand allowing a first release of tomatoes from the vines V, before entering the backside of the as shaker brush 16, the second stage.

The invention is an improvement over the apparatus described in U.S. Pat. No. 5,197,269 incorporated by reference, in that this invention extends the shaker conveyor 37 under the shaker brash assembly 15, so that the vines are driven by the shaker conveyor 37 and not the shaker brush assembly 15. This allows the feeder bars 31 to feed the vines V into the shaker brush 16 allowing for an initial shaking and then allow the vines V to drop out from the shaker brush 16, thus allowing the vines to expand allowing a first release of tomatoes from the vines V. In addition, the extension of the shaker conveyor 37 allows the shaker conveyor 37 to extend around the fruit cross conveyors 34 and the fruit conveyor 35, instead of doubling back over the fruit conveyor 35, where vine pieces can get caught, roll, and cause plugging.

In addition, allowing the rotation of the shaker brush 15 to be driven by material throughput and the shaker conveyor 37, the shaker brush 15 is better able to handle variations in mass throughput without plugging as seen with direct control of the rotation of the brush speed by a positive motor control.

While preferred embodiment of the present invention has been shown and described herein, it will be appreciated that various changes and modifications may be made therein without departing from the spirit of the invention as defined by the scope of the appended claims.

What is claimed is:

1. A harvester for harvesting and separating fruits from vines, comprising:

a shaker brush;

a vine reel horizontally spaced apart from the shaker brush;

means for providing fruit and vines to the shaker brush a first time, wherein the means for providing is adjacent to the shaker brush; and a shaker conveyor positioned to catch fruit and vines, which are provided to the shaker brush a first time and conveying the fruit and vines into engagement with the shaker brush a second time and subsequently conveying the fruit and vines into engagement with the vine reel, wherein the shaker conveyor extends trader the shaker brush and the vine reel.

2. The harvester, as recited in claim 1, wherein the shaker conveyor, comprises:

a first endless belt extending under the shaker brush and the vine reel;

a second endless belt extending under the shaker brush and the vine reel; and a plurality of rods extending from the first endless belt to the second endless belt.

3. The harvester, as recited in claim 2, wherein the vine reel comprises:

a reel frame;

a plurality of tines extending from the reel frame; and means for rotating the reel frame.

4. The harvester, as recited in claim 3, wherein the vine reel further comprises, a means for keeping the plurality of tines in the same direction.

5. The harvester, as recited in claim 4, further comprising a fruit conveyor, surrounded by the shaker conveyor.

6. The harvester, as recited in claim 3, wherein the vine reel further comprises a means for maintaining the plurality of tines at a set angle from the vertical position as the vine reel is rotated.

7. The harvester, as recited in claim 6, wherein the plurality of rods of the shaker conveyor are spaced apart from each other by a distance in the range from 3 to 6 inches.

8. The harvester, as recited in claim 7, wherein the plurality of rods of the shaker conveyor are spaced apart a distance of 4 inches.

9. A method of harvesting and separating fruits from vines, comprising the steps of:

cutting the vines;

providing the fruits and vines to a shaker brush a first time;

dropping the fruits and vines from the shaker brush;

catching the fruits and vines on a shaker conveyor;

conveying the fruits and vines to the shaker brush a second time;

conveying the fruits and vines from the shaker brush to a vine reel; and passing loosened fruits through the shaker conveyor.

10. A harvester for harvesting and separating fruits from vines, comprising:

a harvester frame a shaker brush supported by the harvester frame;

a vine reel horizontally spaced apart from the shaker brush and supported by the harvester frame;

means for providing fruit and vines to the shaker brush a first time, wherein the means for providing is supported by the harvester frame adjacent to the shaker brush; and a shaker conveyor supported by the harvester frame and positioned to catch fruit and vines, which are provided to the shaker brush a first time and conveying the fruit and vines into engagement with the shaker brush a second time and subsequently conveying the fruit and vines into engagement with the vine reel, wherein the shaker conveyor extends under the shaker brush and the vine reel.

11. The harvester, as recited in claim 10, wherein the shaker conveyor, comprises:

a first endless belt extending under the shaker brush and the vine reel;

a second endless belt extending under the shaker brush and the vine reel; and a plurality of rods extending from the first endless belt to the second endless belt.

12. The harvester, as recited in claim 11, wherein the vine reel comprises:

a reel frame;

a plurality of tines extending from the reel frame; and means for rotating the reel frame.

13. The harvester, as recited in claim 12, wherein the vine reel further comprises, a means for keeping the plurality of tines in the same direction.

14. The harvester, as recited in claim 13, further comprising a fruit conveyor, surrounded by the shaker conveyor.

15. The harvester, as recited in claim 14, wherein the vine reel further comprises a means for maintaining the plurality of tines at a set angle from the vertical position as the vine reel is rotated.

16. The harvester, as recited in claim 15, wherein the plurality of rods of the shaker conveyor are spaced apart from each other by a distance in the range from 3 to 6 inches.

17. The harvester, as recited in claim 16, wherein the plurality of rods of the shaker conveyor are spaced apart a distance of 4 inches.

\* \* \* \* \*